April 3, 1934.  H. B. HEWITT  1,953,482
BODILY DETACHABLE RESILIENT WHEEL MOUNTING
Filed Oct. 6, 1931
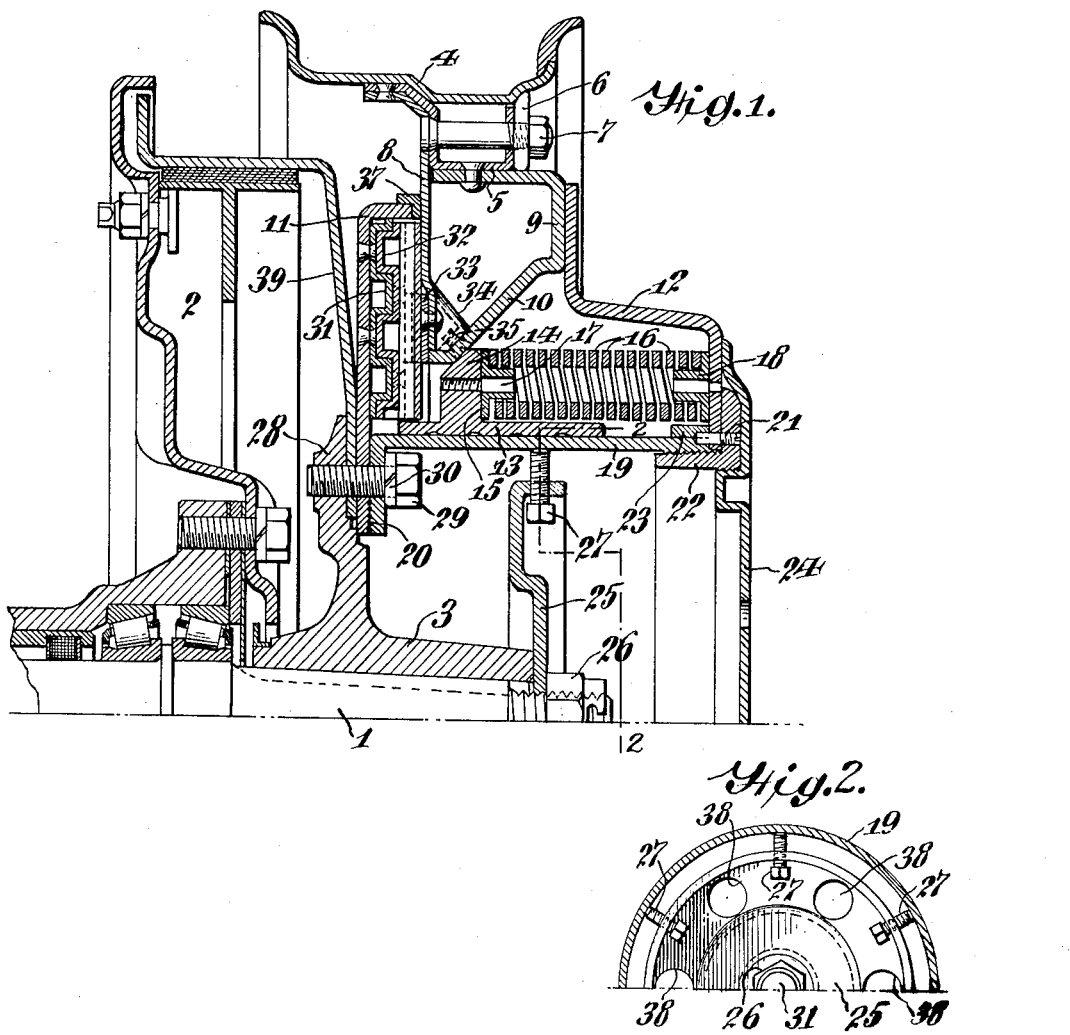
INVENTOR
Howard B. Hewitt
BY
Herbert S. Fairbanks
ATTORNEY

UNITED STATES PATENT OFFICE 1,953,482

BODILY DETACHABLE RESILIENT WHEEL MOUNTING

Howard B. Hewitt, Philadelphia, Pa.

Application October 6, 1931, Serial No. 567,219

5 Claims. (Cl. 152—28)

My invention relates to improvements to the general class of resilient wheels in which the design of the wheel has been modified from the stiff spoke or disc wheel so as to give under road shock or load shock, and more particularly to that special class of resilient wheels having a slidable sleeve mounted on a special integral wheel hub member and provided with a plurality of abutment members within which a resilient thrust transmitting member is mounted, and wherein provision is made for the displacement of the hub when in use, and having one or more springs surrounding and mounted on the cone part of the sleeve member, for absorbing shocks under impact.

It has heretofore been proposed in this art to construct a resilient wheel with a special heat treated integral wheel hub, having a smooth cylindrical outer surface on which a sleeve member is slidably mounted. This construction, with its special integral wheel hub member, prohibits roadside repairing or adjustment of any part of the wheel mechanism, for it is a well known fact that demounting and remounting of even the simplest type of wheel with an integral hub is a tedious complicated procedure requiring the services of expert workmen in a first class properly equipped service station. In other words, the slightest mishap to any part of the mechanism of these resilient wheels means an indefinite wait to permit the removal of the wheel with its integral hub member from the axle spindle by trained mechanics, plus the more serious problem of properly remounting the wheel and hub with the driving and bearing members and brake drum mechanism, etc. correctly positioned and adjusted. The contemplation of the foregoing contingency, which must be anticipated in a resilient wheel of this type with its many coacting parts, has been the main contributing factor to prevent the commercial introduction of these wheels, notwithstanding their many desirable features which includes a phenomenal reduction in unsprung weight in combination with the independent springing of each wheel.

The primary object of this invention is to devise a bodily mountable and demountable resilient wheel mounting.

A further object of this invention is to construct a flexible wheel with a slidable sleeve, without the use of an integral hub member which has heretofore been deemed essential.

A further object of this invention is to construct a flexible wheel with a slidable sleeve employing a detachable hub member with a suitable flange on which the assembled wheel mechanism may be mounted with bolts or screws.

A further object of this invention is to provide a special cylindrical member to support the slidable sleeve.

A further object of this invention is to construct a flexible wheel with a slidable sleeve employing a detachable hub member with a suitable flange on which the assembled wheel mechanism may be mounted with bolts or screws and having bolt holes in said flange positioned to permit the interchange of certain types of standard stiff bolton wire, wood or steel wheels with said assembled flexible wheel structure.

A further object of this invention is to provide a reinforcing means in direct contact with the vehicle axle and held in an immovable position against the inner wall of the special cylinder which supports the slidable sleeve so that any unusual shock which may be imparted to the wheel is directed to the vehicle axle or hub with a minimum of strain on the hub flange. This feature is of the utmost importance because of the general use of malleable iron hubs on motor vehicles which have certain limitations in resisting shock whereas the vehicle axle on all motor vehicles is usually of high grade heat-treated steel and capable of resisting any shock.

It will be evident from the foregoing that my new and novel construction of a flexible wheel with slidable sleeve supported by a special cylindrical member, in which the assembled wheel mechanism is held in position on a detachable hub with bolts and screws and having a reinforcing member held in rigid position on the vehicle axle to resist severe shock, that any slight mishap to the mechanism of the wheel can be examined and repaired on the road by any experienced automotive mechanic as it will be possible to detach the entire wheel mechanism from the vehicle hub by merely removing the bolts or screws that hold it in position. In the event of a series mishap to the mechanism of the wheel, the entire assembled wheel mechanism can be detached as quickly as it is now possible to remove a standard bolt-on stiff wheel for replacement of the crippled wheel with a spare flexible wheel or a standard bolt-on stiff wheel. In other words, any mishap to a flexible wheel embodying my new and novel construction minus the integral wheel hub is no more serious than a similar mishap to a standard bolt-on wheel which can be replaced with a new wheel by any person capable of using a wrench, and any repairing required can be done in a properly equipped shop by experienced mechanics without interfering with the operation of the vehicle while the repairing is going on.

With my invention it is possible to maintain complete standardization of all wheel parts for any variation in hub sizes, which are different for every car becoming larger with the increase in weight of the vehicle, can be compensated for by a change in position of the bolt holes on the inside flange of the special cylinder on which the slidable sleeve is mounted. With the present integral wheel hub construction it is necessary in maintaining a fair degree of standardization of the wheel parts to manufacture a hub member of excessive weight and expense for 70% of the motor cars in operation today since the outside diameter of the hubs on these cars is very much smaller than those on the better class cars. This difference in many cases is as much as 3″ so that any attempt to have a common integral hub to meet all conditions is impracticable except within certain restricted limitations and complete standardization of the flexible wheel parts for all types of cars is out of the question except by the use of my new and novel construction.

In accordance with this invention the vehicle owner will be able to carry a spare wheel for emergencies and the demounting and mounting of the assembled flexible wheel structure can be accomplished anywhere in a few minutes and with the same ease as it is now possible to mount and demount a standard bolt-on stiff wire, wood or steel wheel in the event of trouble or for a periodic examination of the mechanism, and the commercial exploitation of this type of wheel can now be made with every assurance that the prospective purchaser will no longer refuse to accept these wheels with their tremendous advantages over the standard stiff wheel because of the many contingent complications that were possible with the same wheel when built with an integral hub member.

With the above and other objects in view, as will hereinafter appear, my invention comprehends a novel bodily mountable and demountable resilient wheel mounting.

Other novel features of construction and advantage will hereinafter appear in the detailed description and the appended claims.

For the purpose of illustrating my invention, I have shown in the accompanying drawings a preferred embodiment of it, which, in practice, will give satisfactory and reliable results. It is, however, to be understood that this embodiment is typical only, and the various instrumentalities of which my invention consists can be variously arranged and organized, and the invention is not limited to the exact arrangement and organization of these instrumentalities as herein set forth.

Figure 1 is a sectional view of a bodily mountable and demountable resilient wheel mounting for a rear axle of a motor vehicle.

Figure 2 is a section on line 2—2 of Figure 1.

Similar numerals of reference indicate corresponding parts.

Referring to the drawings:

Referring first to Figure 1, 1 designates the rear axle of a motor vehicle. 2 designates a conventional brake drum assemblage. The brake drum 39 is carried by the flange 28 of the wheel hub 3, which is fitted to the axle 1.

It is to be understood that this invention is not limited to any specific type of resilient wheel, and for purpose of illustrtion only, a construction has been shown as substantially conforming to that disclosed in the Corbin Patent No. 1,664,389, patented March 27, 1928. I will, therefore, describe the resilient wheel construction with only sufficient detail that its assembly and operation may be understood by those skilled in the art, reference being directed to the above specified patent for a more detailed description of the construction and operation of the resilient wheel per se.

The resilient wheel consists of two members capable of eccentric displacement and resilient means to restrain such displacement.

4 designates a conventional drop center rim which is secured to the felloe 5 by means of a rim clamp 6 and fastening devices 7. 8 designates the inner wheel plate and 9 designates the outer wheel plate which is provided with a conical bowl 10. 11 designates the inner abutment and 12 the outer abutment. 13 designates a slidable sleeve provided with a cone bearing member 14. 15 is an annular spring aligning member having lugs 17 to receive the springs 16. At the outer end a similar spring aligning member 18 is employed which simply bears against the outer abutment 12. The sleeve 13 is slidably mounted on a cylindrical bearing member 19 flanged at its inner end and riveted or welded to the inner abutment 11, the weld being shown at 20. Set screws 21 pass through a closure nut 22, which is in threaded engagement with the cylindrical bearing member 19 and also engaging a ring 23 closely engaging the bearing 19. 24 designates a cap retained in position in any desired manner and illustrated as in threaded engagement with the closure nut 22.

A flanged disc 25 is mounted on the axle 1 and fixed thereto by the nut 26. The flange at the outer periphery of such disc is provided with the adjustable supports 27 in the form of bolts bearing against the bearing member 19. The resilient wheel assembly is fixedly connected with the flange 28 of the hub 3 by bolts 29 provided with lock washers 30, the bolts passing through the flange of the cylindrical bearing member 19, the inner abutment 11 and the brake drum 39, and in threaded engagement with the hub flange 28. A lubricant retaining ring 37 is preferably employed between the inner abutment 11 and the inner wheel plate 8.

The drive for the resilient wheel will now be explained.

The inner abutment 11 has riveted to it an inner drive plate 31 provided with flutes and splines cooperating with flutes and splines on a drive ring 32 which also has flutes and splines cooperating with flutes and splines on an outer drive plate 33 riveted to the inner wheel plate 8. The inner wheel plate 8 is riveted to the felloe 5. The outer wheel plate 9 is also riveted to the felloe 5. The inner wheel plate 8 has spaced depressions 34 to enable one to attach it to the bowl 10, by means of the screws 35.

The manner of assembly the resilient wheel will now be apparent. Parts 5, 8, 9 and 33 are assembled as a unit and constitute the floating assembly of the wheel. Such floating assembly is connected with the driving mechanism to form an operative unit with the outer abutment 12, springs 16, nut 22, and bearing member 19.

I now have a resilient wheel unit demountable and remountable as a unit of structure. The disc 25 which forms an auxiliary support has circumferentially spaced openings 38 through which, upon removal of the cap 24, a suitable tool can be inserted to tighten or loosen the bolts 29.

It will thus be apparent that by actuating the bolts 29 and 27 the resilient wheel can be bodily mounted on the hub or demounted from the hub by removing the axle nut 26.

In accordance with this invention I provide an auxiliary adjustable support for the resilient wheel which overcomes any excessive strains on the hub flange under severe road shock or impact throughout the range of resilient movements of the construction.

It will, of course, be understood that I do not desire to be limited to any specific type of auxiliary support, the construction shown being but one of many embodiments which can be used.

It will be apparent from the foregoing that in accordance with this invention a resilient wheel can be secured to any standard or conventional type of hub as a unit of structure without the necessity and use of skilled labor as anyone can mount it or demount it with respect to the hub.

In so far as I am aware, I am the first in the art to devise a resilient wheel mounting wherein two revoluble members are employed capable of eccentric displacement, and an auxiliary support is provided which transmits abnormal stresses and strains to the axle, and it is to be understood that my claims to such features are to receive a broad and generic interpretation.

In a resilient wheel of this type the location of the stresses and strains do not occur at a fixed point on the hub or axle but at variable locations along the axis of rotation of the axle.

It will now be apparent that I have devised a new and useful bodily detachable resilient wheel mounting which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particles without departing from the spirit or scope of the invention or sacrificing any of its advantages.

Having thus described my invention what I claim as new and desire to secure by Letters Patent, is:—

1. The combination with a resilient wheel, having two members capable of eccentric displacement with resilient means to retain them in working relation, said members having a cylindrical bearing, an axle, and a conventional hub on said axle, means to mount said wheel as a unit of structure on said hub in such a manner that it can be bodily mounted and demounted, a disc fixed to said axle and means adjustably carried by said disc and adapted to engage said bearing to form an auxiliary support.

2. The combination with the axle of a wheel and its hub, of a resilient wheel, means to secure said wheel to said hub and remove it therefrom as a unit of structure, and a rigid auxiliary support to transmit stresses from said wheel to said axle and relieve strain on said hub.

3. A mounting for a resilient wheel having two revoluble members capable of eccentric displacement with resilient means tending to maintain them in axial alignment and with inboard and outboard abutments, comprising a hub, an axle for the hub, fastening devices to secure said resilient wheel to said hub, and an auxiliary support for said resilient wheel detachably mounted on said axle.

4. A mounting for a resilient wheel having revoluble members capable of eccentric displacement with means to retain them in working relation, with inboard and outboard abutments and a cylindrical bearing, comprising a hub, an axle to receive the hub, fastening devices to secure the wheel to the hub, and an auxiliary support on the axle having means to engage said bearing.

5. A mounting for a resilient wheel having revoluble members capable of eccentric displacement with means to retain them in working relation, with inboard and outboard abutments and a cylindrical bearing, comprising a hub, an axle to receive the hub, fastening devices to secure the wheel to the hub, an auxiliary support on said axle, a nut for said axle, and means adjustably carried by said support to contact with said cylindrical bearing.

HOWARD B. HEWITT.